UNITED STATES PATENT OFFICE.

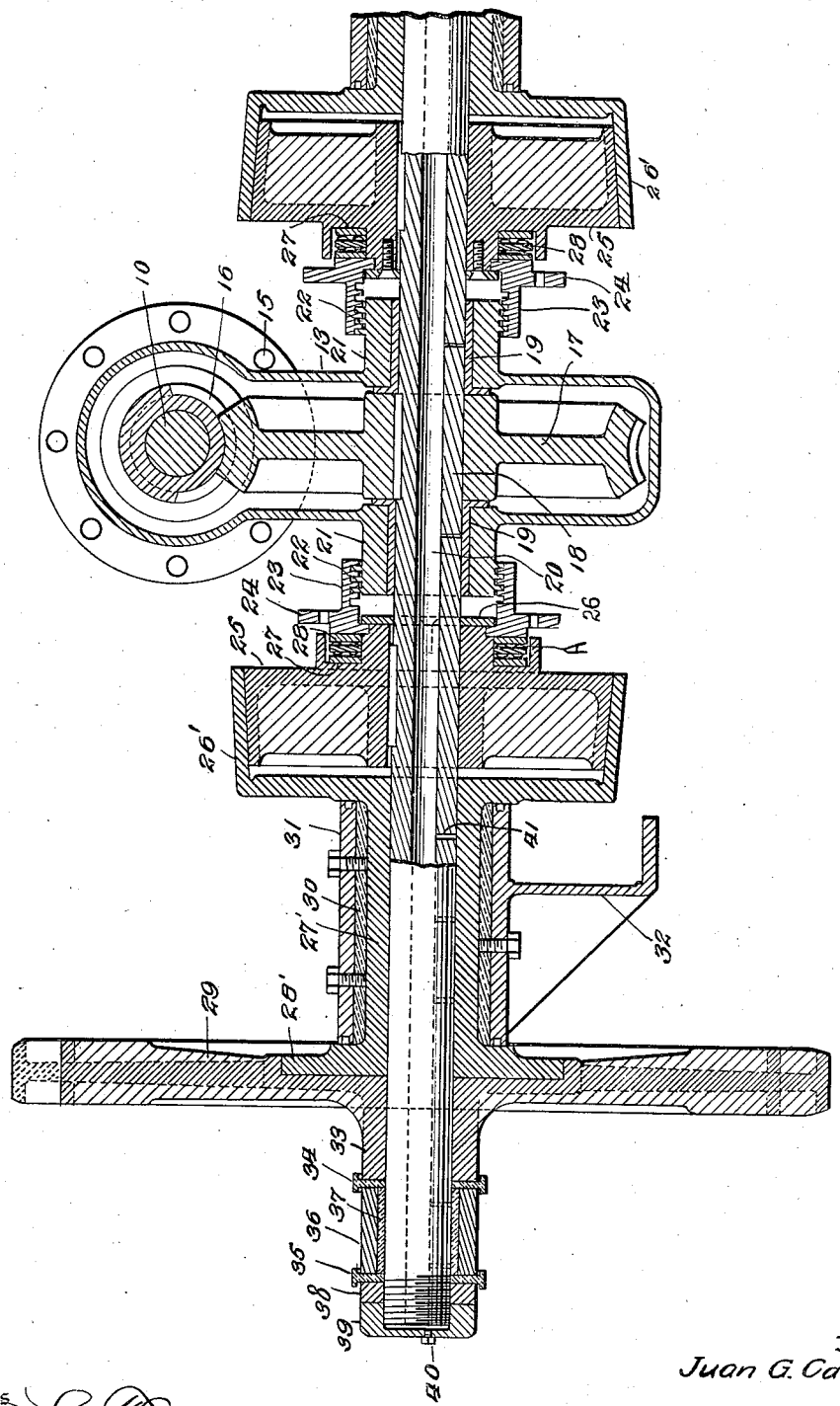

JUAN G. CASTERAN, OF BUENOS AIRES, ARGENTINA.

GEARING FOR TRACTORS.

1,138,452.   Specification of Letters Patent.   Patented May 4, 1915.

Application filed June 23, 1913. Serial No. 775,318.

*To all whom it may concern:*

Be it known that I, JUAN G. CASTERAN, a citizen of the Argentine Republic, residing at Buenos Aires, Argentina, have invented certain new and useful Improvements in Gearing for Tractors; and I do hereby declare the following to be a full, clear, and exact description of the invention, such as will enable others skilled in the art to which it appertains to make and use the same.

This invention relates to a gearing for tractors and has for an object to provide an efficient means for driving and steering tractors.

Another object of this invention is to provide means for driving the sprocket wheels to either or both sides of the driving medium.

A further object of this invention is an improved means for lubricating the moving parts and to have such lubricating means protected from grit and dust.

Further objects will be apparent from the following specification, appended claims and drawings, in which the figure shows a sectional view through a portion of a rear axle of a tractor showing the same partially through a vertical plane and partially through a horizontal plane.

In devices similar to this for use in tractors, it is necessary that the gearing should serve to permit the rotation of the sprocket wheel at one end of the shaft irrespective of the sprocket wheel at the opposite end thereof and a further function of this type of gearing is to control the steering of the tractor. In order that this device may be clearly understood, the tractor of which it forms a part has sprocket wheels carried by the shafts at the opposite ends thereof and upon these sprocket wheels are mounted endless chains which form tracks upon which the tractor runs. In steering the tractor it is only necessary to disengage the driving means for one of said chains so that said chain remains idle while the opposite chain continues to drive the tractor forward and it is apparent that as one chain is dragging while the other chain is driving the tractor will turn in the direction of the idle chain.

Referring to the drawings, there is shown a driven shaft 10 which is mounted in bearings formed in a casing 13. The lower bearing is formed in the plug which is removable and secured to the casing 13 as by bolts 15. This shaft carries a worm 16 which engages a worm gear 17 mounted upon a shaft 18 and this shaft is mounted in bushings 19 formed in bearings in the casing 13 as shown. The gear 17 may be keyed or otherwise secured to the shaft 18 and the shaft 18 is hollow to form a chamber in which lubricant is placed as shown at 20. The hubs 21 which extend from the opposite sides of the casing 13 are provided with threads 22 of which, those at one side of the casing are cut as right hand threads while those at the opposite side of the casing are cut as left hand threads and these threads are intended to receive the threaded interior of a sleeve 23 which has a flange 24 extending therefrom which flange is adapted to receive an operating lever not shown by which the sleeve 23 is rotated.

To each side of the housing 13, the sleeve 23 engages in a recess A in a clutch member 25 and to hold said sleeve in engagement therewith, a plate 26 is secured to the end of the clutch member 25 as shown. This clutch member is further recessed as at 27 to receive a ball or roller bearing 28 between the bottom of said recess and the end of the sleeve 23 and through this ball or roller bearing pressure is exerted from the sleeve 23 against the clutch 25 to force the clutch member in engagement with a cup 26' which is cut to conform with the periphery of the clutch member 25. The clutch member 25 is driven by the shaft 18 and may be keyed or otherwise secured to said shaft in a manner to permit said clutch being freely slidable on said shaft.

The cup 26' has a hub 27' extending therefrom which forms a bearing for the shaft 18 and from the opposite end of said hub extends a flange 28' which fits in a recess formed in the sprocket wheel 29 and said sprocket wheel and flange 28' are securely fastened to one another. The hub 27' rotates in a bushing 30 which is secured in a bearing 31 and this bearing has a bracket 32 extending therefrom to receive the channel or I beam not shown forming part of the frame of the tractor.

In the drawings, the bracket 32 is shown swung from its normal position as in reality the axis of the shaft 10 is vertical while the beam secured in the bracket 32 is horizontal. The sprocket wheel 29 has the usual hub 33 and this hub is forced outwardly when the clutch member 25 is jammed in the cup 26' so to take care of this thrust I provide washers 34 and 35 positioned at the ends of a sleeve 36 in which is mounted a bushing 37 and the washer 35 bears against the nut 38 which nut is locked upon the end of the shaft by the lock nut 39. The lock nut 39 is of a cap formation and is drilled to receive a plug 40. Through the cap 39 lubricant is fed to the interior of the shaft 18 or into the chamber 20 and from this chamber the lubricant is fed through conduits 41 to those parts having movement with respect to one another, carried by the shaft 18.

The drawings submitted herewith are for illustrative purposes only and various modifications may be made within the scope of this invention without departing from the spirit thereof.

Having thus described my invention, I claim:

1. In a gearing for tractors, a driving shaft, a driven shaft at angles thereto and driven thereby, a housing for said driving shaft, clutch members carried by and driven by said driven shaft, sprocket wheels rotatably carried by said driven shaft, cups carried by said sprocket wheels and a rotatable sleeve carried by each side of said housing to engage said clutch members with said cups carried by said sprocket wheels for driving said sprockets from said driven shaft.

2. In a gearing for tractors, a driving shaft, a shaft driven by said driving shaft, a housing for said driving and driven shafts, said driven shaft extending in opposite directions from said housing, bearings formed in said housing for said driven shaft, clutch members driven by and slidable on said driven shaft, sprocket wheels rotatably carried by said driven shaft, co-acting clutch-members secured to said sprocket wheels, and sleeves rotatably mounted on said housing for moving said slidable clutch members into binding engagement with the co-acting clutch members carried by said sprocket wheels.

3. In a gearing for tractors, a driving shaft, a housing for said driving shaft, a shaft driven by said driving shaft extending through said housing, wheels rotatably carried by said driven shaft, clutch members for driving said wheels with said driven shaft, said clutch members comprising members slidably mounted on said driven shaft, sleeves rotatably mounted on said housing, said sleeves controlling the sliding movement of said sliding clutch members, and said sleeves being operable independently of each other.

In testimony whereof I affix my signature in presence of two witnesses.

JUAN G. CASTERAN.

Witnesses:
GEORGE L. THORN,
HUGO MOCK.